US010056634B2

(12) United States Patent
Zheng et al.

(10) Patent No.: US 10,056,634 B2
(45) Date of Patent: Aug. 21, 2018

(54) SYSTEMS AND METHODS FOR FUEL DESULFURIZATION

(71) Applicant: HONEYWELL INTERNATIONAL INC., Morristown, NJ (US)

(72) Inventors: Daguang Zheng, Torrance, CA (US); Dacong Weng, Rancho Palos Verdes, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 199 days.

(21) Appl. No.: 14/735,889

(22) Filed: Jun. 10, 2015

(65) Prior Publication Data

US 2016/0365594 A1 Dec. 15, 2016

(51) Int. Cl.
*H01M 8/0662* (2016.01)
*H01M 8/04694* (2016.01)
(Continued)

(52) U.S. Cl.
CPC ............ *H01M 8/0675* (2013.01); *C01B 3/38* (2013.01); *H01M 8/04694* (2013.01); *H01M 8/0618* (2013.01); *C01B 2203/0233* (2013.01); *C01B 2203/0244* (2013.01); *C01B 2203/066* (2013.01); *C01B 2203/1235* (2013.01); *C01B 2203/1258* (2013.01); *C01B 2203/16* (2013.01); *H01M 8/04425* (2013.01);
(Continued)

(58) Field of Classification Search
CPC ........... H01M 8/0675; H01M 8/04694; H01M 8/0618; H01M 8/04425; H01M 8/04947; H01M 2250/20; C01B 3/38; C01B 2203/0244; C01B 2203/0233; C01B 2203/16; C01B 2203/1258; C01B 2203/1235; C01B 2203/066; Y02T 90/32

See application file for complete search history.

(56) References Cited

U.S. PATENT DOCUMENTS 6,984,372 B2    1/2006  Randhava et al.
7,303,598 B1 *  12/2007  Namazian ................. C01B 3/34
                                                      208/79
(Continued)

FOREIGN PATENT DOCUMENTS

WO    2006084002 A2    8/2006
WO    2008027762 A2    3/2008

OTHER PUBLICATIONS

Hamid Reza Mortaheb et al.; A review on removal of sulfur components from gasoline by pervaporation; Chemical Engineering Research and Design; Part A, vol. 90, No. 3, Mar. 2012.

(Continued)

*Primary Examiner* — Eugenia Wang
(74) *Attorney, Agent, or Firm* — Lorenz & Kopf, LLP

(57) ABSTRACT

Methods and apparatus are provided for a fuel cell including a fuel desulfurization system. The fuel cell system includes a source of fuel and a fuel desulfurization system fluidly coupled to the source of fuel to receive the fuel in a liquid phase. The fuel desulfurization system includes a vacuum system that depressurizes the fuel to convert at least a portion of the fuel from the liquid phase to a gaseous phase. The fuel cell system also includes a fuel cell stack fluidly coupled to the fuel desulfurization system to receive fuel from the fuel desulfurization system in the gaseous phase.

12 Claims, 3 Drawing Sheets

(51) Int. Cl.
  *H01M 8/0612* (2016.01)
  *H01M 8/0438* (2016.01)
  *H01M 8/04828* (2016.01)
  *C01B 3/38* (2006.01)

(52) U.S. Cl.
  CPC .... *H01M 8/04947* (2013.01); *H01M 2250/20* (2013.01); *Y02T 90/32* (2013.01)

(56) References Cited

U.S. PATENT DOCUMENTS

| | | | |
|---|---|---|---|
| 7,318,845 B2 | 1/2008 | Shaaban et al. | |
| 7,455,923 B2 | 11/2008 | Katikaneni | |
| 8,702,910 B2 | 4/2014 | Duraiswamy et al. | |
| 2002/0035306 A1 | 3/2002 | Gore et al. | |
| 2005/0121365 A1 | 6/2005 | Weston et al. | |
| 2005/0164051 A1* | 7/2005 | Venkataraman | B01J 8/0257 429/410 |
| 2005/0246059 A1* | 11/2005 | Meyer | H01M 8/0606 700/231 |
| 2006/0169639 A1* | 8/2006 | Duraiswamy | B01D 61/362 210/640 |
| 2007/0012184 A1* | 1/2007 | Duraiswamy | B01D 61/362 95/54 |
| 2008/0107932 A1* | 5/2008 | Pham | C01B 3/38 48/197 R |
| 2009/0035622 A1 | 2/2009 | King et al. | |
| 2009/0162708 A1* | 6/2009 | Zhu | C01B 3/16 429/420 |
| 2010/0018903 A1 | 1/2010 | Baez et al. | |
| 2010/0133193 A1 | 6/2010 | Zulauf et al. | |
| 2011/0143229 A1 | 6/2011 | Chellappa et al. | |
| 2011/0198231 A1* | 8/2011 | Eickhoff | C25B 1/04 205/335 |
| 2012/0015259 A1 | 1/2012 | Budge | |
| 2013/0078540 A1 | 3/2013 | Ratnasamy et al. | |
| 2013/0143136 A1* | 6/2013 | Ukai | H01M 8/0438 429/410 |
| 2013/0192246 A1* | 8/2013 | Kamath | F02C 7/228 60/776 |
| 2013/0330555 A1 | 12/2013 | Herskowitz et al. | |
| 2014/0061098 A1 | 3/2014 | Du et al. | |
| 2014/0166539 A1 | 6/2014 | Balepin et al. | |
| 2014/0197109 A1 | 7/2014 | Laricchia et al. | |
| 2014/0260964 A1 | 9/2014 | Rohr et al. | |

OTHER PUBLICATIONS

Pasel J et al.; Desulfurization of jet fuel by pervaporation, Journal of Membrane Science; vol. 390, Oct. 19, 2011.

Extended EP Search Report for Application No. 16172338.2-1373 dated Oct. 31, 2016.

Alsolami, B., "HDS for Fuel Cell Applications," Texas A&M University geboren te Jamum, Saudi Arabia, 2012.

Kasuga, S., et al. "Vacuum Packaged Micro-fuel Reformer for high thermal efficiency and Low Package temperatures," Micro Electro Mechanical Systems, 2008.

* cited by examiner

SYSTEMS AND METHODS FOR FUEL DESULFURIZATION

TECHNICAL FIELD

The present disclosure generally relates to systems and methods for desulfurization of a fuel, and more particularly relates to desulfurization of a fuel for use with a fuel cell system.

BACKGROUND

Generally, fuel cell systems employ a hydrogen-rich gas for power generation. Certain fuels, while rich in hydrogen, may also contain sulfur. Fuels with sulfur may form hydrogen sulfide and sulfur oxide during reformation by the fuel cell system. Hydrogen sulfide and sulfur oxide are generally detrimental to fuel reforming units and fuel cell performance, as hydrogen sulfide and sulfur oxide contaminate the reformer and fuel cell catalysts. Certain methods for desulfurization can involve the use of an adsorbent, which can add undesirable weight and require routine maintenance to replace the used absorbent.

Accordingly, it is desirable to provide improved systems and methods for fuel desulfurization, which does not require the use of an absorbent, thereby reducing system weight and maintenance requirements. Furthermore, other desirable features and characteristics of the present invention will become apparent from the subsequent detailed description and the appended claims, taken in conjunction with the accompanying drawings and the foregoing technical field and background.

SUMMARY

According to various embodiments, a fuel cell system is provided. The fuel cell system includes a source of fuel and a fuel desulfurization system fluidly coupled to the source of fuel to receive the fuel in a liquid phase. The fuel desulfurization system includes a vacuum system that depressurizes the fuel to convert at least a portion of the fuel from the liquid phase to a gaseous phase. The fuel cell system also includes a fuel cell stack fluidly coupled to the fuel desulfurization system to receive fuel from the fuel desulfurization system in the gaseous phase.

A method of fuel desulfurization is provided, according to various embodiments. The method includes receiving fuel from a fuel source in a first phase and depressurizing the fuel in the first phase in a vacuum system to convert at least a portion of the fuel into a second phase. The method further includes reforming the portion of the fuel in the second phase to create a hydrogen enriched fuel in the second phase, and delivering the hydrogen enriched fuel in the second phase to a fuel cell stack.

Also provided according to various embodiments is a fuel cell system. The fuel cell system includes a source of fuel and a fuel desulfurization system including a tank, a source of a vacuum and a pump. The tank is fluidly coupled to the source of fuel to receive the fuel in a liquid phase. The source of the vacuum applies a negative pressure to the tank to convert at least a portion of the fuel from the liquid phase to the gaseous phase. The pump is in fluid communication with the source of fuel to return a portion of the fuel in the liquid phase from the tank to the source of fuel. The fuel cell system also includes a reformer fluidly coupled directly to the fuel desulfurization system to receive fuel from the fuel desulfurization system in the gaseous phase and to generate a hydrogen enriched fuel in the gaseous phase. The fuel cell system includes a fuel cell stack fluidly coupled directly to the reformer to receive the hydrogen enriched fuel in the gaseous phase.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any system requiring desulfurization of a fuel, and that the fuel cell system described herein is merely one exemplary embodiment for a fuel desulfurization system of the present disclosure. Moreover, while the fuel desulfurization system is described herein as being used with a fuel cell system onboard a mobile platform, such as a bus, motorcycle, train, motor vehicle, marine vessel, aircraft, rotorcraft and the like, the various teachings of the present disclosure can be used with a stationary fuel cell system as well. In addition, as used herein "desulfurized fuel" is intended to mean fuel with a reduced concentration of sulfur and sulfur compounds in parts per million (ppm) as compared to standard, untreated fuel. Further, it should be noted that many alternative or additional functional relationships or physical connections may be present in an embodiment of the present disclosure. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
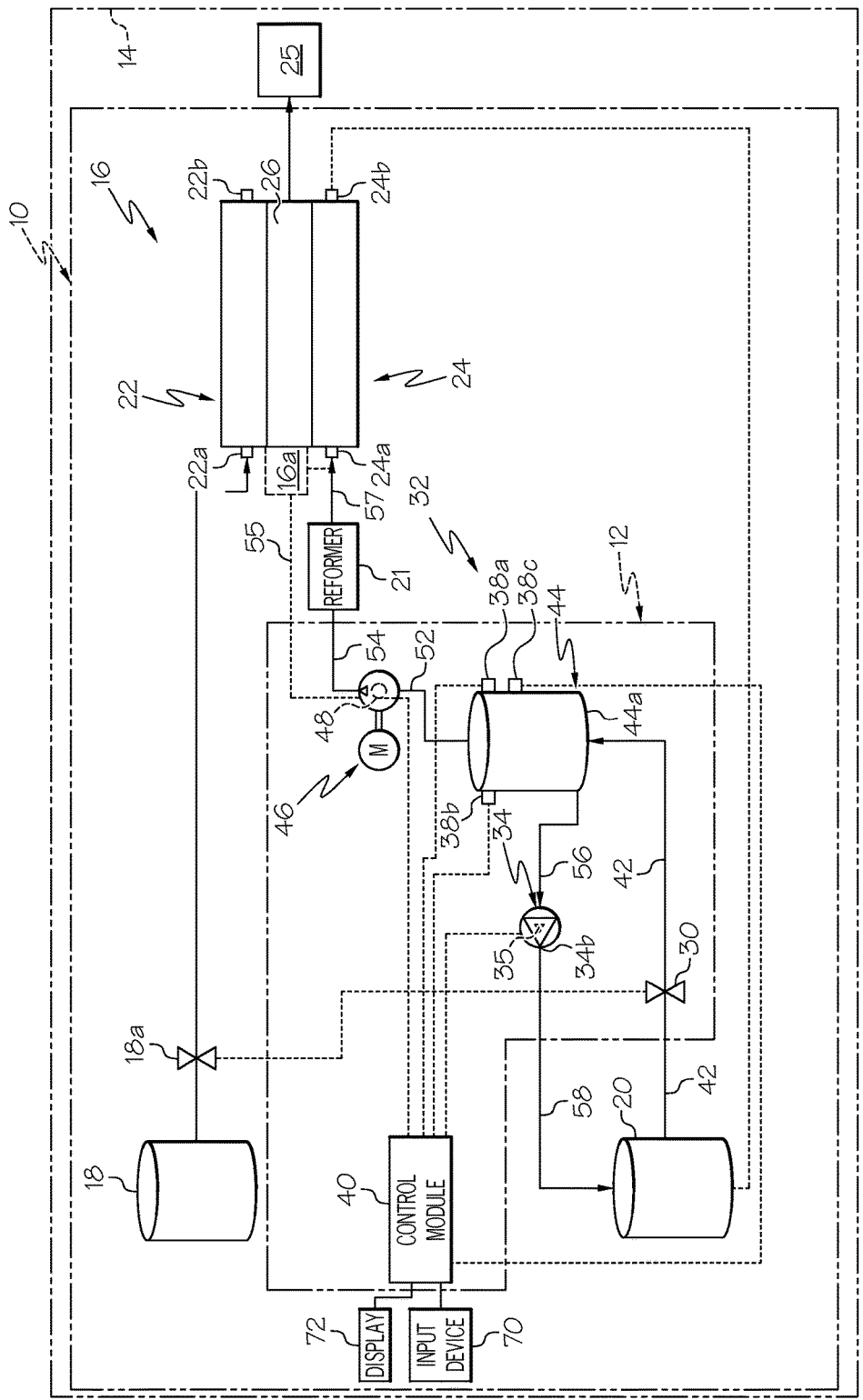
FIG. 1 is a schematic perspective illustration of a fuel cell system that includes a fuel desulfurization system in accordance with various embodiments.

With reference to FIG. 1, a fuel cell system 10 is shown. The fuel cell system 10 includes a fuel desulfurization system 12. The fuel cell system 10 can be part of a mobile platform 14, such as a bus, motorcycle, train, motor vehicle, marine vessel, aircraft, rotorcraft and the like. In the following example, the mobile platform 14 is described herein as being an aircraft; however, it will be appreciated that the present teachings of the present disclosure can be applied to any suitable mobile platform and/or stationary fuel cell system. As will be discussed, the fuel desulfurization system 12 desulfurizes, removes or reduces a concentration of sulfur or sulfur compounds, such as benzothiophene, from a fuel source. Although the figures shown herein depict an example with certain arrangements of elements, additional intervening elements, devices, features, or components may be present in an actual embodiment. It should also be understood that FIG. 1 is merely illustrative and may not be drawn to scale.

In addition, for the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

With continued reference to FIG. 1, the fuel cell system 10 includes a fuel cell stack 16, a gas source 18, a fuel source 20, a reformer 21 and the fuel desulfurization system 12. Although the fuel cell stack 16, the gas source 18, the fuel source 20, the reformer 21 and the fuel desulfurization system 12 are illustrated herein as being contained within or located onboard the mobile platform 14, it will be understood that one or more of the gas source 18, the fuel source 20 and the fuel desulfurization system 12 can be located remote from the mobile platform 14, if desired.

As the fuel cell stack 16 can comprise any suitable conventional fuel cell stack 16 known in the art, the fuel cell stack 16 will not be discussed in great detail herein. Briefly, in one example, the fuel cell stack 16 can comprise a proton exchange or polymer electrolyte membrane (PEM) fuel cell stack 16. It should be noted that the example of a PEM fuel cell stack 16 is merely exemplary, as the fuel cell stack 16 can comprise any suitable fuel cell stack 16, including, but not limited to a solid oxide fuel cell stack. Generally, as is known in the art, in the example of a PEM fuel cell stack, the fuel cell stack 16 includes a cathode 22 and an anode 24, which are separated by an electrolyte, such as a polymer electrolyte membrane 26. The fuel cell stack 16 also optionally includes an internal fuel reformer 16a, which generates a hydrogen rich fuel for use by the anode 24. The internal fuel reformer 16a comprises any suitable internal reformer for use with a fuel cell stack as known to one of skill in the art, such as a steam reformer or autothermal reformer, and thus, the internal fuel reformer 16a of the fuel cell stack 16 will not be discussed in great detail herein. Briefly, however, the internal fuel reformer 16a receives fuel from the fuel desulfurization system 12, and generates a chemical reaction with the received fuel to create a hydrogen enriched fuel for use by the anode 24. The hydrogen enriched fuel is provided from the internal fuel reformer 16a of the fuel cell stack 16 to the anode inlet 24a for use by the fuel cell stack 16.

The cathode 22 includes a cathode inlet 22a and a cathode outlet 22b. The cathode 22 is in communication with the gas source 18 to receive gas at the cathode inlet 22a. In one example, the gas is air, however, it should be noted that any suitable gas can be supplied by the gas source 18 to the cathode inlet 22a of the cathode 22. The anode 24 includes an anode inlet 24a and an anode outlet 24b. The anode inlet 24a is in communication with the fuel desulfurization system 12 and/or the reformer 21 to receive a hydrogen containing fuel or hydrocarbon based fuel with a reduced sulfur content, as will be discussed in greater detail herein.

As known in the art, the catalysts in the polymer electrolyte membrane 26 facilitates an electrochemical reaction between oxygen in the gas received at the cathode inlet 22a from the gas source 18 and hydrogen in the fuel received at the anode inlet 24a from the fuel desulfurization system 12 and/or reformer 21. The electrochemical reaction results in electrical energy, which can be conducted from the fuel cell stack 16 to one or more electrical consumers 25 located downstream from the fuel cell stack 16 through suitable transmission components as known to those skilled in the art. For example, the fuel cell stack 16 can provide electrical power to one or more systems associated with the mobile platform 14, such as heating and cooling system components, start-up components, etc. Thus, the term "consumers" is understood to mean any device or component in communication with or downstream from the fuel cell stack 16 that can receive electrical energy from the fuel cell stack 16 to drive, power or operate the particular component. The cathode outlet 22b receives water generated by the electrochemical reaction at the cathode 22, and the anode outlet 24b receives the remaining fuel from the electrochemical reaction. The cathode outlet 22b can be in communication with one or more systems to condense the water for use onboard the mobile platform 14. The anode outlet 24b can be in communication with the fuel source 20 such that any remaining fuel is conducted back to the fuel source 20.

The gas source 18 is in communication with the cathode inlet 22a of the fuel cell stack 16 to supply the fuel cell stack 16 with a gas, such as an oxygen rich gas or oxygen. In one example, the gas source 18 is a source of air, however, the gas source 18 can comprise any suitable supply of gas for use with the fuel cell stack 16. The gas source 18 can comprise air received from the surroundings of the mobile platform 14, such as air contained within the mobile platform 14 or air drawn in from the environment surrounding the mobile platform 14. For example, in the embodiment of an aircraft, the gas source 18 can comprise air drawn in from the environment or can comprise air from within a fuselage of the aircraft. Moreover, the gas source 18 can comprise a source of compressed oxygen, which can be stored onboard the mobile platform 14. The gas source 18 can also optionally include a valve 18a, if desired, to control the flow of gas from the gas source 18 to the fuel cell stack 16. In one example, the valve 18a can comprise an electrically actuatable one-way valve, which can be in communication with a control module 40 associated with the fuel desulfurization system 12. The valve 18a is actuatable to move between a first, opened position to allow the flow of gas from the gas source 18 and a second, closed position to prevent the flow of gas from the gas source 18 based on one or more control signals received from the control module 40.

The fuel source 20 is in communication with the fuel desulfurization system 12. The fuel source 20 may also optionally be in communication with the reformer 21. The fuel source 20 comprises any suitable source of hydrogen containing or hydrocarbon based fuel. The fuel source 20 can be disposed within the mobile platform 14, and can comprise a fuel tank, which can be fillable with a suitable hydrogen containing fuel. In the example of an aircraft, the fuel source 20 can comprise one or more of the wing mounted fuel tanks and/or center tanks associated with the aircraft. The fuel contained in the fuel source 20 can comprise at least amounts of hydrogen, generally in the form of hydrocarbons, and sulfur or sulfur compounds, for example, in the form of benzothiophene. In one example, the fuel source 20 can comprise a source of jet fuel. Exemplary jet fuels can comprise Jet A, Jet A-1 and Jet B. In certain instances, jet fuel can comprise up to 3000 parts per million (ppm) of sulfur or sulfur containing compounds. In order to optimize the performance of the fuel cell stack 16, the fuel source 20 is in communication with the fuel desulfurization system 12 to remove or reduce the amount of sulfur or sulfur containing compounds, such as benzothiophene, in the fuel prior to the fuel entering the reformer 21 and/or the anode inlet 24*a*.

The reformer 21 is downstream from the fuel desulfurization system 12, and upstream from the fuel cell stack 16. The reformer 21 comprises any suitable reformer for fuel known in the art, the reformer 21 will not be discussed in great detail herein. Briefly, in one example, the reformer 21 comprises a steam reformer or autothermal reformer. It should be noted that the example of a steam reformer or autothermal reformer are merely exemplary, as the reformer 21 can comprise any suitable reformer. The reformer 21 has an inlet in fluid communication with the fuel desulfurization system 12 to receive a hydrogen containing fuel or hydrocarbon based fuel with a reduced sulfur content via a conduit 54. Generally, the reformer 21 includes a reactant for reacting with the hydrogen containing fuel or hydrocarbon based fuel, and the chemical reaction between the reactant and the hydrogen containing fuel or hydrocarbon based fuel can generate additional amounts of hydrogen, thereby creating a hydrogen enriched fuel as known to one skilled in the art.

For example, in the embodiment of a steam reformer, the reformer 21 includes a base metal catalyst, which can be contained in a housing associated with the reformer 21. The reactant can be disposed in the housing in any suitable fashion to react with a mixture of steam and the hydrogen containing fuel or hydrocarbon based fuel from the fuel desulfurization system 12, and in one example, the reactant can form a reactant bed, over which the steam and fuel mixture flows. The reaction between the base metal catalyst and hydrogen containing fuel or hydrocarbon based fuel converts the fuel into hydrogen ($H_2$), carbon monoxide (CO) and carbon dioxide ($CO_2$), thereby generating a hydrogen enriched, reduced sulfur content fuel for the fuel cell stack 16. The reformer 21 includes an outlet in fluid communication with the anode inlet 24*a* of the fuel cell stack 16 to provide the anode 24 with the hydrogen enriched fuel via a conduit 57.

The fuel desulfurization system 12 includes a valve 30, a vacuum system 32, a pump 34, one or more sensors 38 and the control module 40. The valve 30 is coupled to or disposed within a fluid conduit 42 that couples the fuel source 20 to the vacuum system 32. It should be noted that for the ease of illustration, a single fluid conduit 42 is shown to extend between the fuel source 20 and the vacuum system 32, however, multiple interconnected fluid conduits can be disposed between the fuel source 20 and the vacuum system 32 to supply the vacuum system 32 with fuel from the fuel source 20, if desired. The valve 30 is in communication with the control module 40 and responsive to one or more control signals from the control module 40 to open or close a fluid path defined by the fluid conduit 42. Stated another way, in one example, the valve 30 comprises an electrically actuatable one-way valve that permits the flow of fuel from the fuel source 20 in a first, opened position, and prevents the flow of fuel from the fuel source 20 in a second, closed position. It should be noted that while the valve 30 is illustrated herein as being disposed or in communication with the conduit 42 between the vacuum system 32 and the fuel source 20, the valve 30 can be disposed or in communication with the conduit 42 at any desired location.

The vacuum system 32 is in fluid communication with the fuel source 20 to receive fuel through the conduit 42 based on the position (opened or closed) of the valve 30. The vacuum system 32 is generally downstream from the valve 30 and downstream from the fuel source 20. The vacuum system 32 is also in communication with the control module 40 to receive one or more control signals to control the operation of the vacuum system 32. In one example, the vacuum system 32 is capable of vaporizing a liquid fuel received from the fuel source 20. As the vacuum system 32 comprises any suitable vacuum system capable of vaporizing a liquid fuel known to one skilled in the art, the vacuum system 32 will not be discussed in great detail herein. Generally, the hydrogen containing fuel or hydrocarbon based fuel is provided by the fuel source 20 in a liquid state. The liquid fuel from the fuel source partially vaporizes in a tank 44 associated with the vacuum system 32, which is operating under a negative pressure. The vaporization factor of the fuel varies based on the composition of the fuel provided by the fuel source 20.

The vacuum system 32 includes the tank 44 and a source of negative pressure or a vacuum blower 46. The tank 44 is in fluid communication with the fuel source 20 to receive the fuel from the fuel source 20 in a first, liquid phase. The tank 44 comprises any suitable sized and shaped structure necessary to accommodate the fuel during the desulfurization. In one example, the tank 44 has a desired or acceptable level of fuel that can be retained within the tank 44 at any given time. Stated another way, the tank 44 can have a maximum fuel fill level, which can be observed and measured by the one or more sensors 38, as will be discussed further herein. The tank 44 operates under negative pressure or under a vacuum. In one example, the tank 44 is in communication with the vacuum blower 46 such that the vacuum blower 46 draws a negative pressure within the tank 44. The vacuum blower 46 comprises any suitable source of a negative pressure, which is operable based on the receipt of one or more control signals from the control module 40. It should be noted that the use of a vacuum blower is merely exemplary, as the source of negative pressure may comprise a vacuum pump, vacuum compressor or any suitable device that is capable of applying a negative pressure to the tank 44 and drawing the fuel in the second, gaseous phase from the tank 44 to deliver the fuel in the second, gaseous phase to the reformer 21 or the internal fuel reformer 16*a* based on receipt of the one or more control signals from the control module 40. In one example, the vacuum blower 46 comprises a motor 48, which is coupled to one or more rotary blades. The motor 48 is responsive to the one or more control signals from the control module 40 to drive the one or more rotary blades via drive shaft, for example. The vacuum blower 46 is in fluid communication with the tank 44 via a conduit 52 to create a negative pressure within the tank 44. The vacuum blower 46 controls the vaporization of the fuel in the tank 44 by adjusting the negative pressure or vacuum within the tank 44.

While drawing the vacuum within the tank 44, the vacuum blower 46 also creates a flow of fuel vapor or fuel in a second, gaseous phase, which is directed out of the tank 44 to the reformer 21 via the conduit 54. Alternatively, the flow of fuel vapor or fuel in a second, gaseous phase, is directed out of the tank 44 to the internal fuel reformer 16*a* of the fuel cell stack 16 via a conduit 55. Generally, the vacuum blower 46 draws sulfur depleted fuel vapor from the vacuum system 32 and delivers the fuel vapor directly to the reformer 21 via the conduit 54 and/or the internal fuel reformer 16*a* of the fuel cell stack 16 via the conduit 55. It should be noted that the arrangement of the vacuum blower 46 and conduits 52, 54, 55 is merely exemplary, as any number of conduits can be employed, and the vacuum blower 46 can be positioned at any desired location to draw sulfur depleted fuel vapor from the tank 44 for delivery directly to the reformer 21 and/or internal fuel reformer 16a of the fuel cell stack 16.

By creating a vacuum in the tank 44, the fuel that enters the tank 44 from the fuel source 20 is depressurized. In the example of jet fuel, as sulfur and sulfur compounds have a lower volatility than jet fuel, the depressurization of the fuel causes the hydrocarbons in the jet fuel to vaporize, thereby creating a fuel vapor that is rich in hydrocarbons and low in sulfur and sulfur compounds, while the unvaporized fuel is heavy in sulfur and sulfur compounds. Thus, by passing through the vacuum system 32, the fuel from the fuel source 20 is desulfurized such that fuel in the second, gaseous phase containing a low concentration of sulfur and sulfur compounds is introduced directly into the reformer 21 or internal fuel reformer 16a of the fuel cell stack 16, which improves the life of the fuel cell stack 16. In one example, the vacuum system 32 applies a negative pressure between about 0.10 pounds per square inch absolute (psia) to about 15 pounds per square inch absolute (psia). Generally, in the example of the fuel desulfurization system 12 for use with the fuel cell system 10 onboard the mobile platform 14, such as an aircraft, the fuel desulfurization system 12 can be operated while the mobile platform 14 is on the ground or at low altitudes. In this regard, in the example of the mobile platform 14 as an aircraft, at higher altitudes, such as greater than about 20,000 thousand feet, the fuel source 20 is subject to lower environmental pressures, which can generate sufficient desulfurized fuel for use by the fuel cell stack 16. Thus, although not shown herein, the fuel cell system 10 can also include a fuel bypass conduit between the fuel source 20 and the vacuum blower 46, which can be opened and closed via a valve, for example, to enable fuel vapor to be removed from the fuel source 20 directly at higher altitudes, thereby bypassing the fuel desulfurization system 12, if desired.

The pump 34 is in communication with the vacuum system 32. In one example, an inlet 34a of the pump 34 is in communication with a conduit 56 coupled to the tank 44 to draw the liquid fuel from off a bottom 44a of the tank 44. An outlet 34b of the pump 34 can be coupled to and in communication with a conduit 58 coupled to and in communication with the fuel source 20 to enable fuel pressurized by the pump 34 to flow back or return to the fuel source 20. It should be noted that the use of the pump 34 is merely exemplary, as any suitable device can be used to return fuel to the fuel source 20, including, but not limited to, a flow based on gravity. The pump 34 can comprise any suitable pump known to one skilled in the art to draw fuel from the vacuum system 32 for return to the fuel source 20. Moreover, the arrangement of the pump 34 and the conduits 56, 58 is merely exemplary, as any number of conduits 56, 58 can be employed to fluidly couple the vacuum system 32 to the fuel source 20, and further, the pump 34 can be disposed at any suitable location to facilitate the return of fuel to the fuel source 20. The pump 34 is in communication with the control module 40 to receive one or more control signals to control the operation of the pump 34. In one example, the pump 34 includes a motor 35 that drives one or more vanes associated with the pump 34 as known to those skilled in the art. The motor 35 is responsive to the one or more control signals from the control module 40 to turn the vanes, and thereby, pressurize the fuel for delivery to the fuel source 20.

The one or more sensors 38 observe and measure conditions associated with the fuel cell system 10 and generate sensor signals based thereon. In one example, the one or more sensors 38 comprise a pressure sensor 38a, a temperature sensor 38b and a level sensor 38c. The pressure sensor 38a observes and measures a pressure associated with or within the tank 44 (e.g. an operating pressure of the vacuum system 32), and generates sensor signals based thereon. The temperature sensor 38b observes and measures a temperature associated with or within the tank 44 (e.g. an operating temperature of the vacuum system 32) and generates sensor signals based thereon. The level sensor 38c observes and measures a level of the liquid fluid, such as jet A fuel, associated with or within the tank 44, and generates sensor signals based thereon. The one or more sensors 38 are in communication with the control module 40 over a suitable architecture that facilitates the transfer of data and/or power, such as a bus.

In various embodiments, the control module 40 generates the one or more control signals based on user input received from an operator. An input device 70 is manipulable by an operator of the fuel cell system 10 to generate user input. In various embodiments, the user input can include a command to start or stop the operation of the fuel cell system 10, as will be discussed herein. The input device 70 can be implemented as a keyboard (not separately shown), a microphone (not separately shown), a touchscreen layer associated with or as part of a display 72, a switch, a button or other suitable device to receive data and/or commands from the user. Of course, multiple input devices 70 can also be utilized. It should be noted that the input device 70 and the control module 40 can be implemented in various ways, and can be in communication with the reformer 21, the fuel cell stack 16 and the fuel desulfurization system 12 over a suitable architecture or arrangement that facilitates the transfer of data, commands, power, etc.

The control module 40 outputs one or more control signals to the valve 30 to control the position of the valve 30 based on input data from the input device 70. The control module 40 receives the sensor signals from the one or more sensors 38. Based on the sensor signals, the control module 40 outputs one or more control signals to the motor 35 of the pump 34 to control the operation of the pump 34. Based on the sensor signals, the control module 40 also outputs one or more control signals to the motor 48 of the vacuum blower 46 to control the operation of the vacuum blower 46. Based on the sensor signals, the control module 40 also outputs an error message. In one example, the error message can be displayed on the display 72 associated with the fuel cell system 10. The display 72 can be implemented as a flat panel display in communication with the control module 40, but can also comprise a hand held device or portable electronic device in communication with the control module 40. The display 72 comprises any suitable technology for displaying information, including, but not limited to, a liquid crystal display (LCD), organic light emitting diode (OLED), plasma, or a cathode ray tube (CRT). The display 72 can also include the input device 70, if desired. The display 72 is in communication with the control module 40 over a suitable communication architecture or arrangement that facilitates transfer of data, commands, power, etc.

Figure 2:
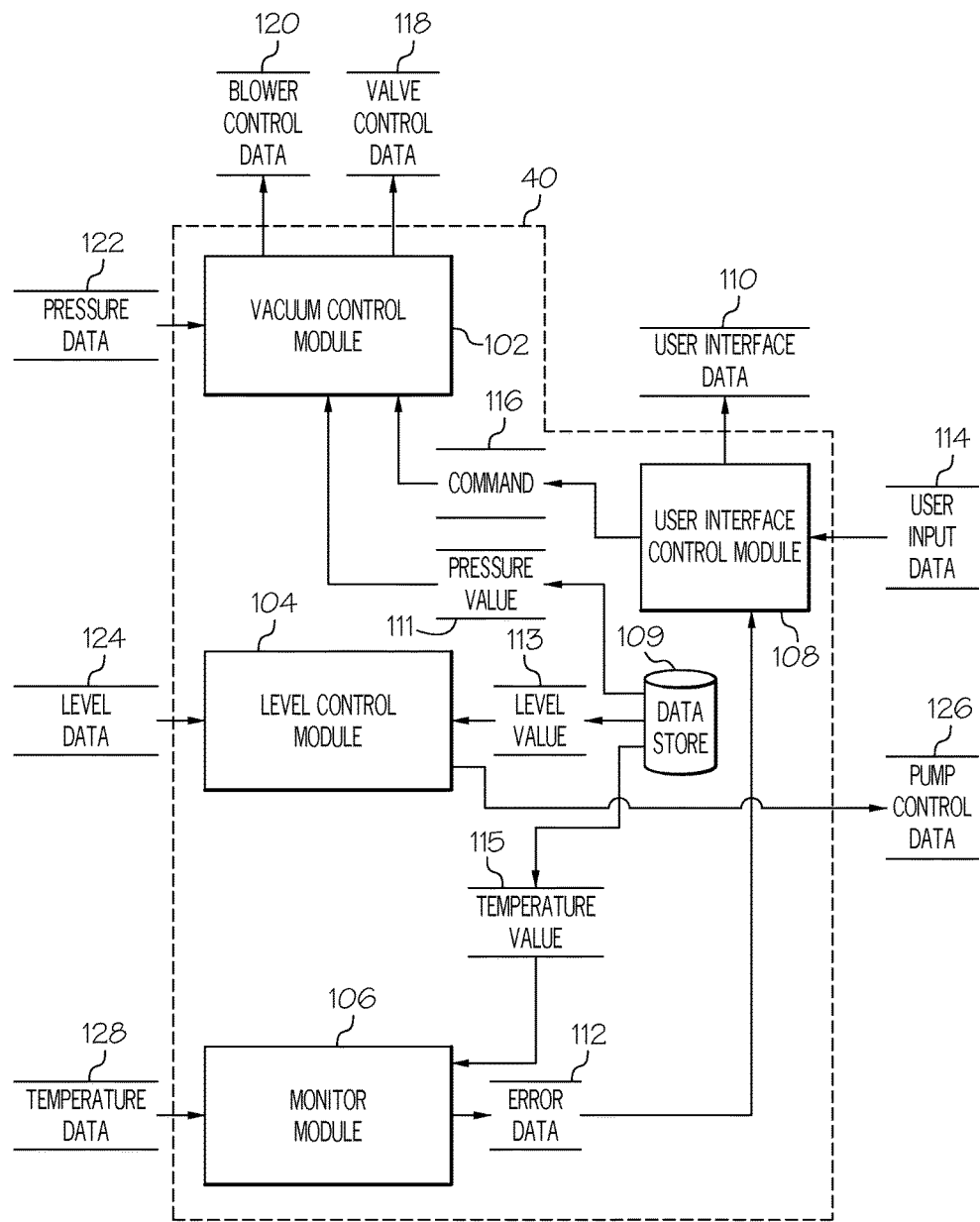
FIG. 2 is a dataflow diagram illustrating a control system of the fuel cell system of FIG. 1 in accordance with various embodiments.

Referring now to FIG. 2, and with continued reference to FIG. 1, a dataflow diagram illustrates various embodiments of the control module 40. Various embodiments of the control module 40 according to the present disclosure can include any number of sub-modules embedded within the control module 40. As can be appreciated, the sub-modules shown in FIG. 2 can be combined and/or further partitioned to similarly control the valve 30, the pump 34 and the vacuum blower 46, and to output the error notification. Inputs to the system can be received from the one or more sensors 38, received from the input device 70, received from other control modules (not shown), and/or determined/modeled by other sub-modules (not shown) within the control module 40. In various embodiments, the control module 40 includes a vacuum control module 102, a level control module 104, a monitor module 106, a user interface (UI) control module 108 and a datastore 109.

The datastore 109 stores one or more values regarding the desired operation for the fuel desulfurization system 12. In one example, the datastore 109 provides an acceptable pressure value 111 for the pressure of the tank 44, an acceptable level value 113 for the level of fuel in the tank 44 and an acceptable temperature value 115 for the temperature of the tank 44. Generally, the pressure value 111 and/or the temperature value 115 comprise an acceptable range for the operation of the fuel desulfurization system 12. In one example, the pressure value 111, the level value 113 and the temperature value 115 are all preset values. It should be understood, however, that one or more of the pressure value 111, the level value 113 and the temperature value 115 can be set or received by an operator via the input device 70.

The UI control module 108 generates user interface data 110 that may be used by the display 72 to display an error notification on a suitable user interface. In one example, the UI control module 108 generates the user interface data 110 based on error data 112 received as input from the monitor module 106. As will be discussed in greater detail below, the error data 112 comprises an error message regarding the operation of the fuel desulfurization system 12. The UI control module 108 also receives as input user input data 114 based on an operator's input to the input device 70 (FIG. 1). In one example, the user input data 114 comprises a command 116 for the operation of the fuel cell system 10 and/or fuel desulfurization system 12. For example, the user input data 114 can comprise a start command or a stop command for the operation of the fuel cell system 10 and/or the fuel desulfurization system 12. The UI control module 108 interprets and provides the command 116 for the vacuum control module 102. The user input data 114 can also comprise one or more acceptable values for the operation of the fuel desulfurization system 12, such as the pressure value 111, the level value 113 and/or the temperature value 115.

The vacuum control module 102 receives as input the command 116. Based on the command 116, the vacuum control module 102 outputs valve control data 118. The valve control data 118 comprises one or more control signals to move the valve 30 between the first, opened position and the second, closed position. On receipt of the command 116 indicating a request for start-up, the vacuum control module 102 outputs the valve control data 118 to move the valve 30 to the first, opened position. On receipt of the command 116 indicating a request for shut down, the vacuum control module 102 outputs the valve control data 118 to move the valve 30 to the second, closed position.

Based on the command 116, the vacuum control module 102 outputs the blower control data 120. The blower control data 120 comprises one or more control signals for the motor 48 of the vacuum blower 46. Stated another way, the blower control data 120 comprises one or more control signals for the motor 48 to operate the vacuum blower 46 and thereby draw the vacuum on the tank 44. The one or more control signals can comprise a speed and/or pressure at which it is desired for the vacuum blower 46 to operate.

The vacuum control module 102 also receives as input pressure data 122. The pressure data 122 comprises sensor data from the pressure sensor 38*a* associated with the vacuum system 32. Stated another way, the pressure data 122 comprises a pressure within the tank 44 as measured and observed by the pressure sensor 38*a*. Based on the pressure data 122, the vacuum control module 102 accesses the datastore 109 and retrieves the pressure value 111. Based on a comparison between the pressure data 122 and the pressure value 111, the vacuum control module 102 also outputs the blower control data 120. For example, if the pressure data 122 is outside of an acceptable range provided by the pressure value 111, then the vacuum control module 102 outputs the blower control data 120. Thus, the vacuum control module 102 controls the operation of the vacuum blower 46 to maintain a desired pressure within the tank 44 based on the pressure data 122, the pressure value 111 and the command 116. In one example, the desired pressure within the tank 44 is a negative pressure between about 2.0 pounds per square inch absolute (psia) and about 15 pounds per square inch absolute (psia).

The level control module 104 receives as input level data 124. The level data 124 comprises the sensor data from the level sensor 38*c*. Stated another way, the level data 124 comprises the level of fuel within the tank 44 as measured and observed by the level sensor 38*c*. Based on the level data 124, the level control module 104 accesses the datastore 109 and retrieves the level value 113. Based on a comparison between the level data 124 and the level value 113, the level control module 104 outputs pump control data 126. The pump control data 126 comprises one or more control signals for the motor 35 of the pump 34 to operate the pump 34. In other words, the pump control data 126 comprises one or more control signals to run the motor 35 of the pump 34 to draw fuel out of the tank 44 and return the fuel to the fuel source 20. Generally, the level control module 104 outputs the pump control data 126 based on the comparison when the level data 124 observed by the level sensor 38*c* indicates that fuel is near or at the maximum fluid level within the tank 44 as provided by the level value 113. Generally, the maximum fluid level within the tank 44 is determined by the size and shape of the tank 44, and the size and shape of the tank 44 may vary based on the requirements of the fuel cell system 10.

The monitor module 106 receives as input temperature data 128. The temperature data 128 comprises sensor data from the temperature sensor 38*b*. Stated another way, the temperature data 128 comprises the temperature within the tank 44 as measured and observed by the temperature sensor 38*b*. Based on the temperature data 128, the monitor module 106 accesses the datastore 109 and retrieves the temperature value 115. Based on a comparison between the temperature data 128 and the temperature value 115, the monitor module 106 generates or sets the error data 112 for the UI control module 108. In one example, the monitor module 106 sets the error data 112 based on the temperature data 128 observed by the temperature sensor 38*b* being outside of a default temperature range as indicated in the temperature value 115. The default temperature range associated with the tank 44 varies based on the design and operating conditions associated with the tank 44. In one example, the default temperature range can range from about negative 40 degrees Fahrenheit (F) to about 200 degrees Fahrenheit (F).

Figure 3:
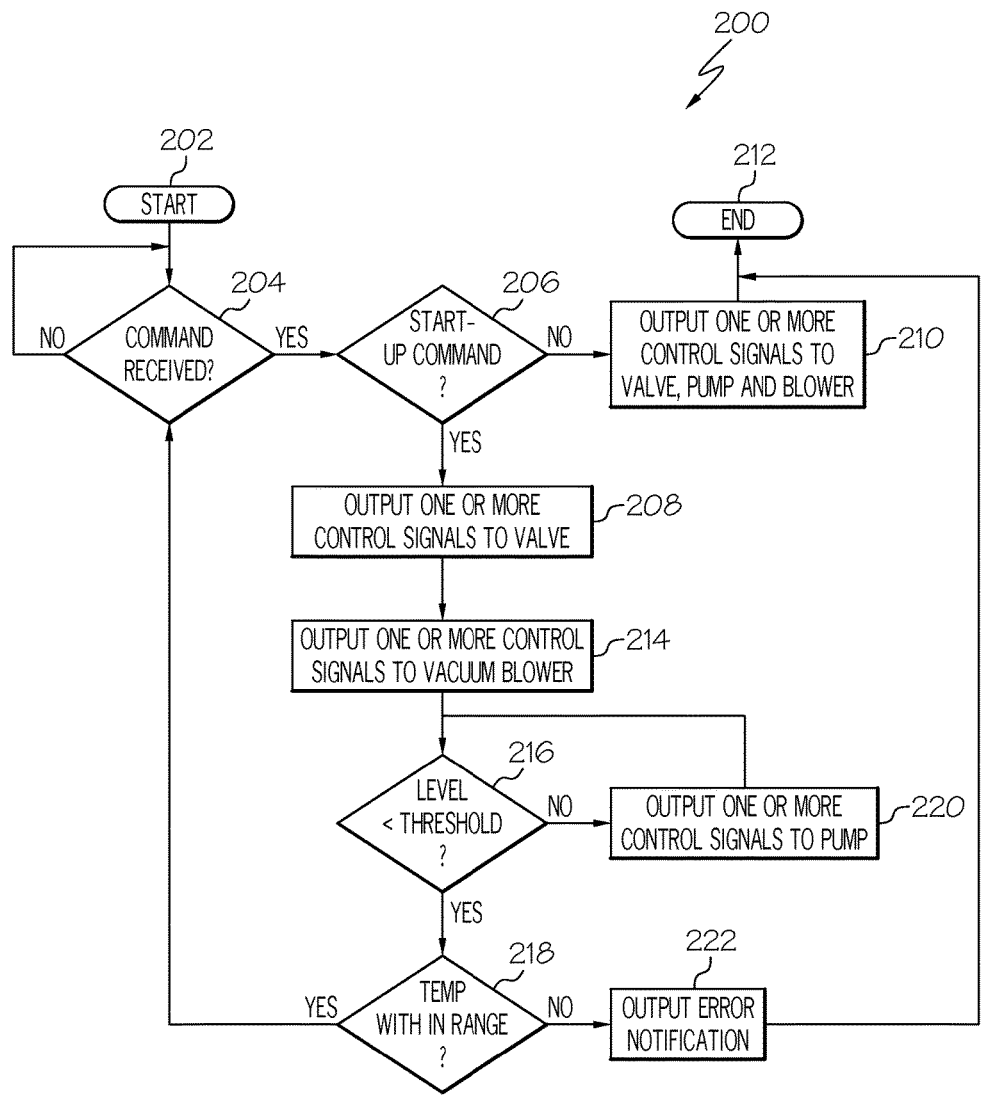
FIG. 3 is a flowchart illustrating a control method of the fuel cell system of FIG. 1 in accordance with various embodiments.

Referring now to FIG. 3, and with continued reference to FIGS. 1-2, a flowchart illustrates a control method that can be performed by the control module 40 of FIGS. 1-2 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method can be scheduled to run based on predetermined events, and/or can run based on the command 116 from the user input data 114.

With reference to FIG. 3, a method 200 for controlling the fuel desulfurization system 12 is shown. The method begins at 202. At 204, the method determines if a command 116 has been received. If the command 116 has been received, the method proceeds to 206. Otherwise, the method continues with monitoring for the command 116.

At 206, the method determines if the received command 116 is a start-up command. If the command 116 is a start-up command, the method proceeds to 208. Otherwise, at 210, the method outputs the one or more control signals to the valve 30 to move from the first opened position, to the second, closed position, outputs the one or more control signals to the motor 35 of the pump 34 to stop the operation of the pump 34 and outputs the one or more control signals to the motor 48 of the vacuum blower 46 to stop the operation of the vacuum blower 46. The method ends at 212.

Otherwise, at 208, the method outputs the one or more control signals to the valve 30 to move the valve 30 to the first, opened position. In the first, opened position, fuel in the first, liquid phase flows into the tank 44 of the vacuum system 32 via the conduit 42. At 214, the method outputs the one or more control signals to the motor 48 of the vacuum blower 46 to drive the vacuum blower 46. The operation of the vacuum blower 46 applies the negative pressure or vacuum to the tank 44, while directing a current of the fuel in the second, gaseous phase from the tank 44 directly to the reformer 21 via the conduit 54 and/or the internal fuel reformer 16a of the fuel cell stack 16 via the conduit 55. It should be noted that while blocks 208 and 214 are illustrated herein as being sequential, these steps can occur substantially simultaneously. Alternatively, the method can output the one or more control signals to the motor 48 of the vacuum blower 46 after a predetermined time delay to ensure that a predetermined amount of fuel is received in the tank 44, for example.

At 216, the method determines if a level of fuel within the tank 44 is less than a threshold level of fuel in the tank 44, based on the level data 124 from the level sensor 38c. If the level of fuel is below the threshold, the method goes to 218. Otherwise, at 220, the method outputs the one or more control signals to the motor 35 of the pump 34 to activate the pump 34. The activation of the pump 34 draws the remaining portion of the fuel in the first, liquid phase out of the tank 44, and returns the fuel to the fuel source 20, thereby lowering the level of fuel within the tank 44. Then, the method loops to 216.

At 218, the method determines if a temperature of the tank 44 is within an acceptable range based on the temperature data 128 from the temperature sensor 38b. If the temperature of the tank 44 is within an acceptable range, the method loops to 204. Otherwise, at 222, the method outputs an error notification, which can be displayed on the display 72.

In one example, with a temperature of the tank 44 of the vacuum system 32 operating at a temperature of 172 degrees Fahrenheit (F), a pressure of the tank 44 of negative 2.0 pounds per square inch absolute (psia) and an inlet fuel with 2753 parts per million (ppm) of benzothiophene, an amount of benzothiophene in the outlet fuel vapor that exits the tank 44 is 245 parts per million (ppm) with a vaporization fraction of 0.107. Thus, in this example, the vacuum system 32 reduces the parts per million (ppm) of sulfur in the form of benzothiophene by about 91%.

In another example, with a temperature of the tank 44 of the vacuum system 32 operating at a temperature of 122 degrees Fahrenheit (F), a pressure of the tank 44 of negative 2.0 pounds per square inch absolute (psia) and an inlet fuel with 2775 parts per million (ppm) of benzothiophene, an amount of benzothiophene in the outlet fuel vapor that exits the tank 44 is 51 parts per million (ppm) with a vaporization fraction of 0.061. Thus, in this example, the vacuum system 32 reduces the parts per million (ppm) of sulfur in the form of benzothiophene by about 98%.

In yet another example, with a temperature of the tank 44 of the vacuum system 32 operating at a temperature of 172 degrees Fahrenheit (F), a pressure of the tank 44 of negative 14.7 pounds per square inch absolute (psia) and an inlet fuel with 2753 parts per million (ppm) of benzothiophene, an amount of benzothiophene in the outlet fuel vapor that exits the tank 44 is 31 parts per million (ppm) with a vaporization fraction of 0.023. Thus, in this example, the vacuum system 32 reduces the parts per million (ppm) of sulfur in the form of benzothiophene by about 99%.

In one example, with a temperature of the tank 44 of the vacuum system 32 operating at a temperature of 122 degrees Fahrenheit (F), a pressure of the tank 44 of negative 14.7 pounds per square inch absolute (psia) and an inlet fuel with 2753 parts per million (ppm) of benzothiophene, an amount of benzothiophene in the outlet fuel vapor that exits the tank 44 is 7 parts per million (ppm) with a vaporization fraction of 0.016. Thus, in this example, the vacuum system 32 reduces the parts per million (ppm) of sulfur in the form of benzothiophene by about 99%.

Thus, the foregoing examples illustrate that the fuel desulfurization system 12 successfully reduces the parts per million of sulfur and sulfur compounds, such as benzothiophene, present in the fuel prior to the fuel flowing to the reformer 21 and/or internal fuel reformer 16a of the fuel cell stack 16. As illustrated above, with a lower operating temperature, lower amounts of sulfur or sulfur compounds in parts per million (ppm) are found in the fuel vapor that flows from the tank 44. In addition, the foregoing examples illustrate that a lower operating pressure of the tank 44 results in a lower vaporization fraction and a manageable fuel flow rate out of the tank 44. Thus, by drawing a negative pressure in the tank 44 with a source of a vacuum, such as the vacuum blower 46, the vacuum system 32 successfully reduces the parts per million of sulfur and sulfur compounds while operating at low temperatures and does not require the use of an external heat source to reduce the parts per million of sulfur and sulfur compounds in hydrogen containing or hydrocarbon based fuels.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A fuel cell system comprising:
   a source of fuel;
   a fuel desulfurization system fluidly coupled to the source of fuel to receive the fuel in a liquid phase, the fuel desulfurization system including a vacuum system that depressurizes the fuel to convert at least a portion of the fuel from the liquid phase to a gaseous phase without an external heat source, the vacuum system including a tank that receives the fuel in the liquid phase from the source of fuel and a vacuum blower that applies a negative pressure to the tank to convert the portion of the fuel from the liquid phase to the gaseous phase, the vacuum blower directing a flow of fuel in the gaseous phase from the tank to a reformer via a first conduit;

the reformer fluidly coupled to the fuel desulfurization system via the first conduit to receive the flow of fuel in the gaseous phase from the fuel desulfurization system and to generate a hydrogen enriched fuel in the gaseous phase; and a fuel cell stack directly fluidly coupled to the reformer via a second conduit to receive the hydrogen enriched fuel in the gaseous phase.

2. The fuel cell system of claim 1, further comprising a valve coupled between the fuel source and the fuel desulfurization system, the valve movable between a first, opened position and a second, closed position to control the flow of fuel into the fuel desulfurization system.

3. The fuel cell system of claim 1, further comprising a pump in fluid communication with the vacuum system and the fuel source, the pump operable to return a portion of the fuel remaining in the vacuum system in the liquid phase to the fuel source.

4. The fuel cell system of claim 1, wherein the source of fuel is a source of jet fuel and the fuel cell system is onboard an aircraft.

5. The fuel cell system of claim 1, wherein the source of fuel is at least one of a wing-mounted fuel tank or center-mounted fuel tank of an aircraft.

6. A fuel cell system for an aircraft, comprising:
a source of fuel received from a wing-mounted fuel tank or a center-mounted fuel tank of the aircraft;
a fuel desulfurization system including a tank, a source of a vacuum and a pump, the tank fluidly coupled to the source of fuel to receive the fuel in a liquid phase, the source of the vacuum is a vacuum blower that applies a negative pressure to the tank to convert at least a portion of the fuel from the liquid phase to the gaseous phase without an external heat source and the vacuum blower directs a flow of the fuel in the gaseous phase from the tank to a reformer via a first conduit, and the pump is in fluid communication with the source of fuel to return a portion of the fuel in the liquid phase from the tank to the source of fuel;

the reformer fluidly coupled to the fuel desulfurization system via the first conduit to receive the flow of the fuel in the gaseous phase from the fuel desulfurization system and to generate a hydrogen enriched fuel in the gaseous phase;

a fuel bypass conduit coupled between the source of fuel and the vacuum blower that is opened or closed via a valve to enable fuel to be removed from the source of fluid directly based on an altitude of the aircraft; and a fuel cell stack fluidly coupled directly to the reformer via a second conduit to receive the hydrogen enriched fuel in the gaseous phase.

7. The fuel cell system of claim 6, wherein the fuel cell system further comprises:
a control module having a processor in communication with a motor to control a speed of the motor; and
at least one sensor that observes a condition of the tank and generates sensor data based on the observed condition,
wherein the control module outputs one or more control signals to the motor based on the sensor data.

8. The fuel cell system of claim 7, wherein the at least one sensor comprises a pressure sensor.

9. The fuel cell system of claim 7, further comprising a source of input, wherein the control module outputs the one or more control signals to the motor of the source of the vacuum based on the input.

10. The fuel cell system of claim 7, further comprising a valve coupled between the fuel source and the fuel desulfurization system, the valve coupled between the fuel source and the fuel desulfurization system movable between a first, opened position and a second, closed position to control the flow of fuel into the tank, the valve coupled between the fuel source and the fuel desulfurization system in communication with the control module and responsive to one or more control signals from the control module to move between the first, opened position and the second, closed position.

11. The fuel cell system of claim 6, wherein the source of fuel is a source of hydrocarbon based jet fuel and the fuel cell system is onboard the aircraft.

12. The fuel cell system of claim 6, wherein the source of vacuum applies a pressure of about negative 0.10 pounds per square inch absolute (psia) to about negative 15 pounds per square inch absolute (psia).

* * * * *